May 6, 1969
A. SCHREIBER
3,442,495
APPARATUS FOR AERATING WASTE WATER
Filed Oct. 19, 1964
Sheet 1 of 2
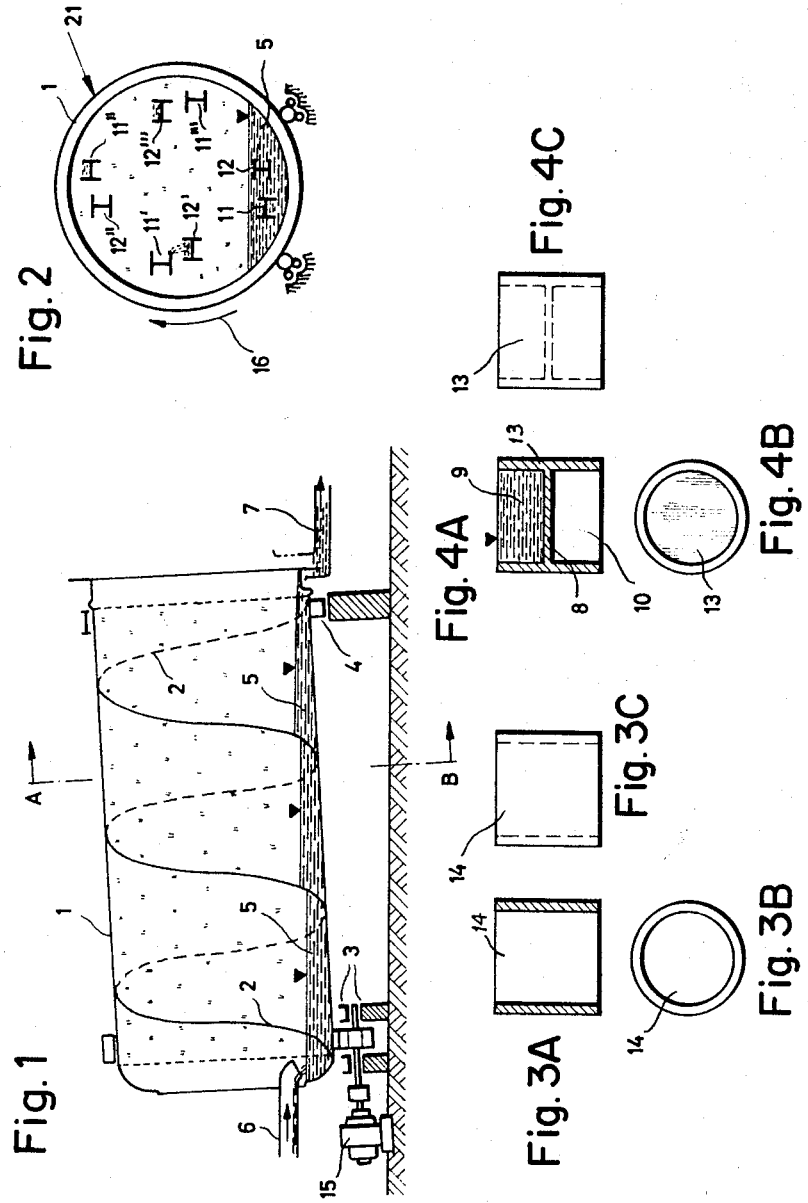
INVENTOR.
August Schreiber
BY
Watson, Cole, Grindle & Watson
Attys.

May 6, 1969  A. SCHREIBER  3,442,495
APPARATUS FOR AERATING WASTE WATER
Filed Oct. 19, 1964  Sheet 2 of 2
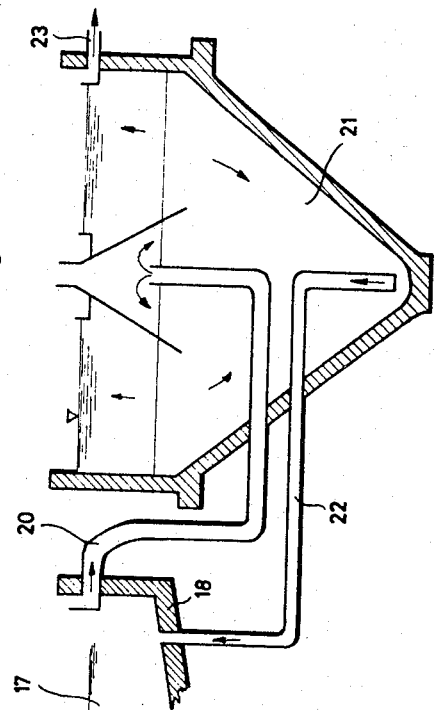
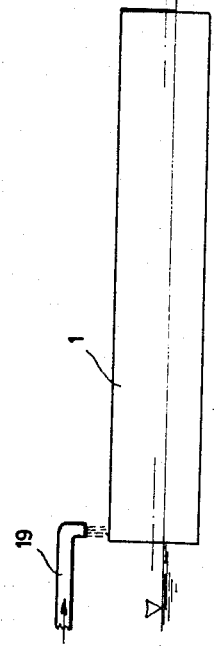
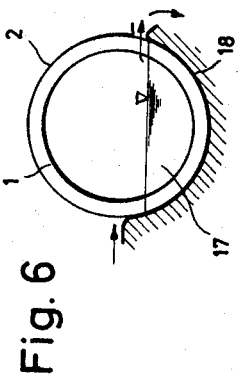
INVENTOR.
August Schreiber
BY
Watson, Cole, Grindle & Watson
Attys.

United States Patent Office 3,442,495
Patented May 6, 1969

3,442,495
APPARATUS FOR AERATING WASTE WATER
August Schreiber, 45A Bahnhofstrasse,
Hannover-Vinnhorst, Germany
Filed Oct. 19, 1964, Ser. No. 404,599
Int. Cl. C02b 3/02; B04b 5/04; B01d 47/16
U.S. Cl. 261—83                                    3 Claims

ABSTRACT OF THE DISCLOSURE

An apparatus for aerating waste water in which a plurality of hollow elements as scoop-like vessels are rotatably mounted in a drum and each vessel is open at both ends with a bottom portion intermediate the ends.

---

The present invention relates to a process and an apparatus for the gasification and degasification and for the cooling of liquids, more particularly for the aeration of water, particularly sewage and other waste water.

In order to bring about changes in the state of water by aeration, gasification, cooling or distributing it over large surface areas, it is known either to lift some of the water clear of the water surface and distribute it in as thin sheets or droplets as possible in order to increase the surface area, or to divide up the water into fine or very fine droplets by spraying, by pulling-up the surface, by using aerating rods to beat into the water, or by horizontal action on falling water or other mechanical effects. It is also known to force air or gas into water, the water coming into contact with the air or gas at the surface of the ascending air or gas bubbles.

The biological purification of water, particularly waste water, can be conducted over granular or porous filling material and aerated in doing so. By distributing waste water over a large surface area of filling material subjected to air, a biological covering of micro-organisms is formed which absorbs the dissolved substances in the waste water as food, and converts them into a sludge which is not soluble in water. Alternatively, the filling material can be immersed into and lifted out again from the water. In such a case, a certain quantity of water remains adhered to the surface of the filling material, so that here again the desired physical, chemical and biological effects are obtained.

For the aeration of water, e.g. waste water in this way, it is known to arrange a loose accumulation of filling material in a rotatable drum in such a manner that, when the drum rotates, the said material is immersed in the waste water introduced into the drum, moves through the water upon further rotation of the drum, and then emerges again from the water, whereupon the filling material, with small portions of water adhering thereto, is moved through a ventilation space of the drum situated above the water and is subjected to the action of air.

An object of the present invention is to provide a simplified and more effective process for the gasification and degasification and also for the cooling of liquids, more particularly for the aeration of waste water, and to improve the productivity of the apparatus used for such purposes, whilst at the same time simplifying the construction thereof.

According to the present invention, there is provided a process for the gasification and degasification and for the cooling of liquids, more particularly for the aerating of waste water, the process comprising the steps of: rotating about its longitudinal axis a drum filled with hollow elements, and simultaneously charging the drum with the liquid to be treated and, where appropriate, with air or gas, whereby the liquid, with the air or gas if appropriate, is moved by means of the hollow elements through the drum, for the greater part by a scooping action.

Preferably, the drum is rotated by a driving motor or by unilateral introduction of the liquid above the drum axis or by blowing-on gas or air unilaterally below the axis of rotation and the surface of the liquid, or by two or all three of the aforesaid possibilities. In the case of unilateral introduction of the liquid, for example, a drum with a perforated generated surface and/or perforated end walls is used onto which the liquid flows unilaterally i.e. eccentrically from a feed pipe or the like, expediently in the vicinity of the charging end of the drum, and thus the drum is rotated. The blowing-on of gas or air is effected in a similar manner, the gas or air also being blown at one side on the end or the generated surface of the drum, whereby the drum is made to rotate. If a non-perforated drum is used, the drum may be rotated by means of a driving motor.

The apparatus for carrying into effect the process according to the invention comprises a rotatably mounted drum which is provided with filling material consisting wholly or partly of hollow elements in the form of scoop-action vessels.

For further improving the productivity, or for lengthening the distance over which the liquid has to travel, it is possible to provide internally and/or externally on the generated surface of the drum guide surfaces for the conveyance of the liquid, e.g. helical or scoop-like guide plates.

In a preferred form of embodiment of the apparatus, the hollow elements constructed in the form of scoop-action vessels are open at both ends and have a transverse middle portion centrally or eccentrically.

In addition to the preferably cylindrical hollow elements constructed as scoop-action vessels, it is possible additionally to provide other filling material elements of different construction in the ventilation chamber defined by the drum. Such additional filling material elements can consist of hollow elements which have the same shape and are of the same size as the hollow elements used as scoop-action vessels, but do not have any transverse middle portion.

Moreover, the filling material may compeltely fill the hollow space of the drum, and be held in the drum by the fact that the filling material elements are clamped against one another in such a manner that when the drum rotates the said elements are not movable relatively to the drum. For this purpose, the drum may be provided with one end wall of the drum which is adjustable in the axial direction of the drum and can be used as a pressure member for clamping the filling material elements against one another.

In operation of the apparatus for carrying into effect the process according to the invention, the filling material elements constructed as scoop-action vessels are lifted out of the liquid by the rotational movement of the drum and, as they do so, if they come out of the water with their transverse middle portions in a horizontal or oblique position, carry along with them liquid or a liquid-air mixture into the ventilation space of the drum. Then, depending on their position, they will only be emptied after a specific rotational movement of the drum. For example, the water can only flow out completely from the vessels, the transverse middle portions of which have been situated approximately horizontally upon issuing from the water, after a quarter-revolution of the drum. In this way, the vessels are emptied at many different heights up to and including their highest position in the drum, the emptied water being partly intercepted again by similar vessels situated lower down in the drum when the drum is in the particular position under consideration and being once more moved into the ventilation region and made to flow out again. Thus the water is made to trickle down in an extremely widely distributed manner which, as compared with trickling processes which, with other filling material elements not constructed as scoop-action vessels, use merely the adhesion of particles of water to the said elements, is augmented almost to the extent to which the water is additionally distributed in trickling fashion by the mechanical scooping and re-scooping action.

In order to simplify the mounting of the drum, the weight of the drum including the filling material and minus the lift which would be provided, when the drum is placed in the liquid, by the air-filled hollow elements below the surface of the liquid, may be such that the drum is capable of being rotatably mounted in a floating or approximately floating fashion in the liquid.

Finally, the aerating drum can be used as a pure aerating device and sludge developer for an activated sludge installation. In the latter case, activated sludge and sewage mixture is conducted through a continuous cycle, the mixture being added to the sewage to be purified and then being subjected to purification. The mixture of activated sludge and the sewage to be purified is aerated within the aerating drum, sludge being produced and kept in movement. After leaving the aerating drum, this sludge-sewage mixture is discharged into a contact basin where it remains in suspension for a specific period of time for the greater part, and then is discharged from the lowest point of the contact basin and again aerated through the aerating drum and returned again to the contact basin. The contact basin can then advantageously be constructed in a combined arrangement with a contact secondary settling basin.

It may also be expedient to arrange several drums in series or in parallel with one another.

For a better understanding of the invention and to show how the same may be carried into effect, reference will now be made, by way of example to the accompanying drawings, in which:

FIG. 1 is a diagrammatic longitudinal sectional view of a drum which may be used for carrying the present invention into effect;

FIG. 2 is a cross-section on the line A–B of FIG. 1;

FIGS. 3A, 3B and 3C comprise a vertical section, a plan view and a side elevational view respectively of an internal component of the apparatus illustrated in FIGS. 1 and 2;

FIGS. 4A to 4C comprise views similar to FIGS. 3A to 3C of an alternative internal component of the drum;

FIG. 5 is a schematic longitudinal sectional view of an alternative arrangement of apparatus which may be used for carrying the invention into effect;

FIG. 6 is a cross-sectional view of a detail of FIG. 5; and

FIG. 7 is a cross-sectional view of a modified aerating drum.

The apparatus shown diagrammatically in FIGS. 1 and 2 can be used for the purification of sewage, for the aeration of water and also for the cooling and degasification of water and other liquids. The aerating drum 1 can be constructed and arranged in any desired manner. In the drawings, helically disposed guide surfaces 2 are arranged fixedly on the generated surface of the drum, which is directed towards the longitudinal axis of the said drum. The aerating drum 1 is arranged slightly inclined in an upward direction in the direction of through-flow of the water being treated. The ends of the drum are bounded by walls provided with air through-flow aerations, e.g. screen walls. Water is admitted at 6 and discharged at 7. The aerating drum 1 is rotatably mounted at 3 and 4 and is rotated in any desired manner for operating the apparatus, the illustrated arrangement employing a driving motor 15. However, the drum could be arranged inclined in some other way or also mounted in horizontal manner as shown in FIG. 5, and could be constructed otherwise than illustrated in FIG. 1. It could also be constructed without the guide surfaces 2.

As shown in FIGS. 1 and 2, the water to be treated enters the drum 1 and only attains a shallow depth relative to the diameter of the drum. Moreover, the drum is otherwise completely filled with filling material, which is so arranged in the drum that the elements forming the filling material are held motionless when the drum rotates owing to the fact that they are held fast against one another. These elements of filling material consist of the cylindrical hollow elements 13 (FIGS. 4A to 4C), and are provided approximately mid-way between their ends with a transverse middle portion 8, thereby forming scoop-action vessels when they are moved through the water by the rotational movement of the drum. In operation, the elements 13 emerge from the water with their scoop or filling chamber directed upwardly. The arrangement of the transverse middle portion 8 substantially mid-way between the ends of the hollow element, forms two scoop or filling chambers 9 and 10 in the said element. The filling material in the drum can consist entirely of these vessels 13, arranged in unordered fashion in the drum, but held fast in their positions relatively to the drum by being clamped against one another. For this purpose, one end wall of the drum can be arranged to be axially adjustable, in a manner not illustrated, and constructed as a pressure member which when tightened e.g. by screws, causes the elements of the filling material to be clamped against one another.

The filling material elements 13, constructed as scoop-action vessels, may, however, also be arranged in the drum together with other filling material elements 14 of different construction, in any desired distribution and in such a manner as to be motionless relative to the drum. The elements 14 are also constructed as cylindrical hollow elements, but are not provided with the transverse middle portions 8 as in the elements 13. Such elements 13 and 14 can be formed by so-called Raschig rings. Conveniently, the filling material elements 14 are of the same size as the filling material elements 13 which are constructed as scoop-action vessels. Other constructions of filling elements may be employed.

In order to explain the trickling operation obtained with the individual cylindrical scoop-action vessels 13, two such vessels 13 are shown by way of example in each quarter of the drum cross-section illustrated in FIG. 2, in identical positions relatively to the drum in each particular quarter. It will be seen that one of the filling material vessels is immersed in the water 5 at a position 11 on the left of FIG. 2, and its scoop chamber 9 is filled with water. When the drum rotates, the said chamber 9 will emerge from the water in a filled state. After a quarter of a revolution of the drum in the clockwise direction indicated by the arrow 16, the said one vessel has rotated with the drum through 90° so that it is now in the position 11'. After a further quarter of a revolution it reaches the position 11'' and after a further quarter of a revolution of the drum it reaches the position 11'''. In the course of the first quarter revoltuion i.e. along the path of the vessel between 11 and 11', the water entrained into the aeration chamber of the drum in the scoop chamber 9 of this vessel is poured out as the position of the vessel changes from 11 to 11'. Then on further revolution from 11' to 11'', the chamber 10 of the scoop-action vessel, which was originally situated below the chamber 9, comes to be situated above the chamber 9 and is filled with water trickling down from other vessels. On rotation through a further quarter of a revolution, this part of the hollow element is emptied again. During the last quarter of its movement up to the point where one complete revolution is completed, the vessel is again immersed in the water with the chamber 9 uppermost, and fills with water.

Another hollow element 13, constructed as a scoop-action vessel as illustrated in FIGS. 4A to 4C is situated at a position 12 in an immersed state with its transverse middle portion 8 in a vertical position. This other vessel or element 13 fills partly during the first quarter of a revolution, and is emptied again during the second quarter of one revolution of the drum. However, upon further rotational movement, it becomes filled again by water trickling from other filling material elements. It again empties during the last quarter of the revolution. Since the vessels 13 are heaped together in an unordered fashion either by themselves or together with other cylindrical hollow elements, such as, for example, elements 14, at a short distance below any such vessel there will always be other vessels in positions corresponding to positions 11 to 12, to collect the emptied water and prevent it from flowing straight through the entire filling material back to the water at the bottom of the drum. In this way, the trickling water is continually lifted into the air space and poured out, without any great expenditure of work being required, since the filled vessels on the left-hand side and on the right-hand side of the axis of rotation substantially balance one another in weight. Only a small proportion of the water has to be lifted by the expenditure of additional work, to be emptied into lower-lying vessels.

FIG. 5 shows a different arrangement for mounting the drum as compared with that shown in FIG. 1. Here, the drum, including the filling material and minus the lift provided by the air-filled hollow elements below the surface of the liquid, is of such a weight that it is mounted in floating fashion in sewage 17 which is contained in a trough 18. Inflow of further sewage is provided through a pipe 19 and outflow through a pipe 20. In order that the drum 1 will rotate, the pipe 19 is so arranged that the arriving sewage, which has been mechanically purified, impinges on the right-hand end portion of the drum as viewed from FIG. 5, at a point on the surface of the upper right-hand quarter of the drum as seen in section approximately designated at 21 in FIG. 2. The generated surface of the drum is provided with perforations for the throughflow of the water into the drum.

As FIG. 5 shows, the drum discharge goes through the pipe 20 to a contact secondary settling basin 21. The greater part of the sludge-water mixture is fed from the lowest point of the basin 21 through a pipe 22 back into the drum 1. Only a proportion of the biologically purified sewage which is situated in the upper portion of the settling basin 21 is freed of sludge and cleansed and discharged through a pipe 23 to a main outfall. The drum shown in FIG. 5 is filled with filling material elements 13 and 14 in the same way as was described in connection with FIGS. 1 to 4c.

FIG. 6 shows in cross-section an arrangement of the floating mounted drum 1 in the aerating trough 18. The rotating drum 1 has a perforated generated surface and is provided at the outer side of the generated surface with a helically disposed guide surface 2 made of rubber or like material. This guide surface slides over the base surface of the trough 18 and in this way conveys the water from the trough inlet in the longitudinal direction of the trough up to the outlet provided at the other end of the trough. During the travel of the water, which, if the helical guide surface 2 has its turns spaced at relatively considerable intervals from one another, proceeds quickly, but which, if the turns of the said helical guide surface are spaced close together, proceeds relatively slowly, the sewage is several times lifted out of the liquid 17, aerated and re-introduced.

The introduction of the water to be aerated is effected at one side of the trough in the direction of the longitudinal axis, and discharge is effected at the other side, also in the direction of the longitudinal axis of the trough.

The forms of embodiment described represent only examples, which may be modified in various ways. For example, FIG. 7, the aerating drum can comprise at the inlet and outlet sides respectively collecting or outflow means which make it possible to introduce the inflow or a diluted inflow directly into the drum. The returned sludge-water mixture from the basin 21 must then be conducted into the inlet pipe 19 and mixed with the mechanically purified sewage. At the outlet side of the aerating drum, an outflow device will be provided which makes it possible for a part of the sewage-sludge mixture to be collected in a funnel of which the pipe 20 leading to the contact secondary settling basin is a continuation. A small outer fraction is then fed as excess sludge to the mechanical preliminary purification stage. In this way there is no need to provide the aerating trough 18, and the entire aerating drum 1 can be operated in an externally dry manner without any special sub-structure and with less trouble from odours.

It is also possible to take pipes from the drum end either inside or outside the drum to the beginning of the drum, so that a certain proportion of the sewage already moved through the drum will flow back again to the beginning of the drum.

The use of the filling material elements constructed as scoop-action vessels has the result that the filling material has considerably distributed trickling effect automatically, so to speak, with the expenditure of little energy, so that apparatus is capable of considerable outputs even if the aerating drum is of a short overall length, and it can be used with considerable success for aerating and de-aerating, cooling and for the biological purification of water.

What I claim is:

1. Apparatus for aerating waste water comprising a rotatably mounted drum and filling material consisting at least partly of hollow elements in the form of scoop-like vessels of cylindrical configuration open at both ends, said elements being clamped in position in the drum, the hollow elements are each formed with a transverse middle portion arranged centrally to provide a double-ended scoop-like vessel.

2. Apparatus according to claim 1, in which additional filling material elements are provided consisting of hollow cylindrical elements of identical size and shape to the hollow elements constructed as scoop-like vessels and without transverse middle portions.

3. Apparatus for aerating waste water comprising a rotatably mounted drum and filling material consisting at least partly of hollow elements in the form of scoop-like vessels of cylindrical configuration open at both ends, said elements being clamped in position in the drum, the hollow elements each being formed with a transverse middle portion arranged substantially centrally to provide a double-ended scoop-action vessel.

References Cited

UNITED STATES PATENTS

| 513,536 | 1/1894 | Scowden | 210—150 |
| 962,168 | 6/1910 | Scholl | 210—403 |

FOREIGN PATENTS

| 22,864 | 1909 | Great Britain. |

MICHAEL E. ROGERS, *Primary Examiner.*

U.S. Cl. X.R.

55—199; 210—7, 17, 151; 261—92, 97